INVENTOR.
R. E. HEFFNER
BY Arnold B. Silverman
his ATTORNEY.

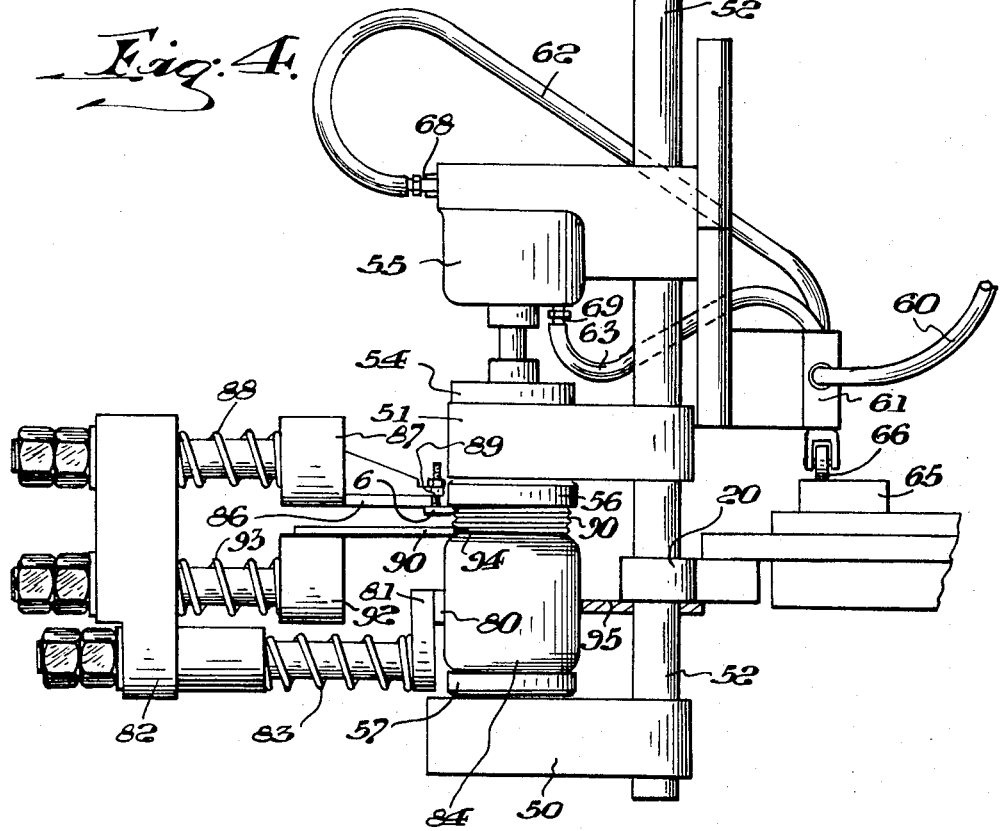

:United States Patent Office 3,429,102
Patented Feb. 25, 1969

3,429,102
SEALING MACHINE
Robert E. Heffner, Lower Burrell, Pa., assignor to Aluminum Company of America, Pittsburgh, Pa., a corporation of Pennsylvania
Filed Dec. 7, 1966, Ser. No. 599,802
U.S. Cl. 53—333       11 Claims
Int. Cl. B67b 3/20; B21d 51/50; B65b 7/28

ABSTRACT OF THE DISCLOSURE

A sealing machine having a multiplicity of container carriers secured to an endless conveyor, and adapted to clampingly engage filled containers having closures loosely applied thereon is provided with a straight edge thread forming blade along a straight side of the path of travel of the carriers, to progressively seal each closure to each container. A screw feed for supplying unsealed containers to the carriers and means for receiving the sealed containers from the carriers may be used.

---

This invention relates to a sealing machine adapted to rapidly and effectively secure closures to containers by means of threads formed during the sealing process.

For some time it has been known in the sealing machine art that container tolerances may be such that pre-threaded closures are difficult to secure to the containers or the tolerances accepted may not be conducive to effective sealing to protect the contents of the container. One method of avoiding these difficulties has been the forming of threads in a closure while it is restrained in place over the mouth of the container which it is to seal. In effect, the problem of compatibility of the closure and container with respect to thread dimensions is eliminated as the closure threads are custom-made to fit the specific container. This method is one long known to the art, and one machine arrangement for practicing the method is illustrated and described in United States Patent No. 1,674,266.

As the commercial demands placed more and more emphasis upon the need for sealing equipment capable of high speed sealing, large turntable machines having a multiplicity of sealing heads came into use. One major problem with such machines is that, as the rotational velocity is increased, the large centrifugal force on a filled, but unsealed container, causes spillage of the contents onto the closure skirt and container exterior. This spillage interferes with the subsequent sealing operation, and creates as well the hazard of matter subject to spoilage being present outside the sealed enclosure. In addition, such turntable machines are relatively inflexible in that substantial modifications are required in order to modify the equipment to seal various sizes of containers and closures. Also, the conventional provision in such machines of mechanical cams for raising and lowering the filled container into and out of contact with a sealing head means that such machines are likely to be relatively imprecise in clamping pressure because of cam wear. They also are relatively inflexible in terms of adaptabiilty to variations in desired head pressure as well as container and closure size.

It is an object of this invention to provide an improved sealing machine adapted for effective high speed sealing of filled containers by custom rolling of threads on closure shells applied to such containers, while eliminating spillage due to centrifugal force on filled containers.

It is another object of this invention to provide such a sealing machine which may be economically, easily and rapidly adjusted to accommodate different size containers and closures.

It is another object of this invention to provide such a sealing machine wherein precise control over sealing pressures is obtained.

Other objects and advantages of the invention will be understood from the following description of the invention, on reference to the drawings appended hereto, in which:

FIGURE 4 is an enlarged view of a sealing head and cooperating apparatus; and

FIGURE 5 is a schematic plan view of the machine showing the spacing and arrangement of the sealing heads, the conveyor member therefor and other portions of the machine as herein described; and FIGURE 6 is a schematic representation of one form of air handling system that may be used in the machine.

Figure 1:
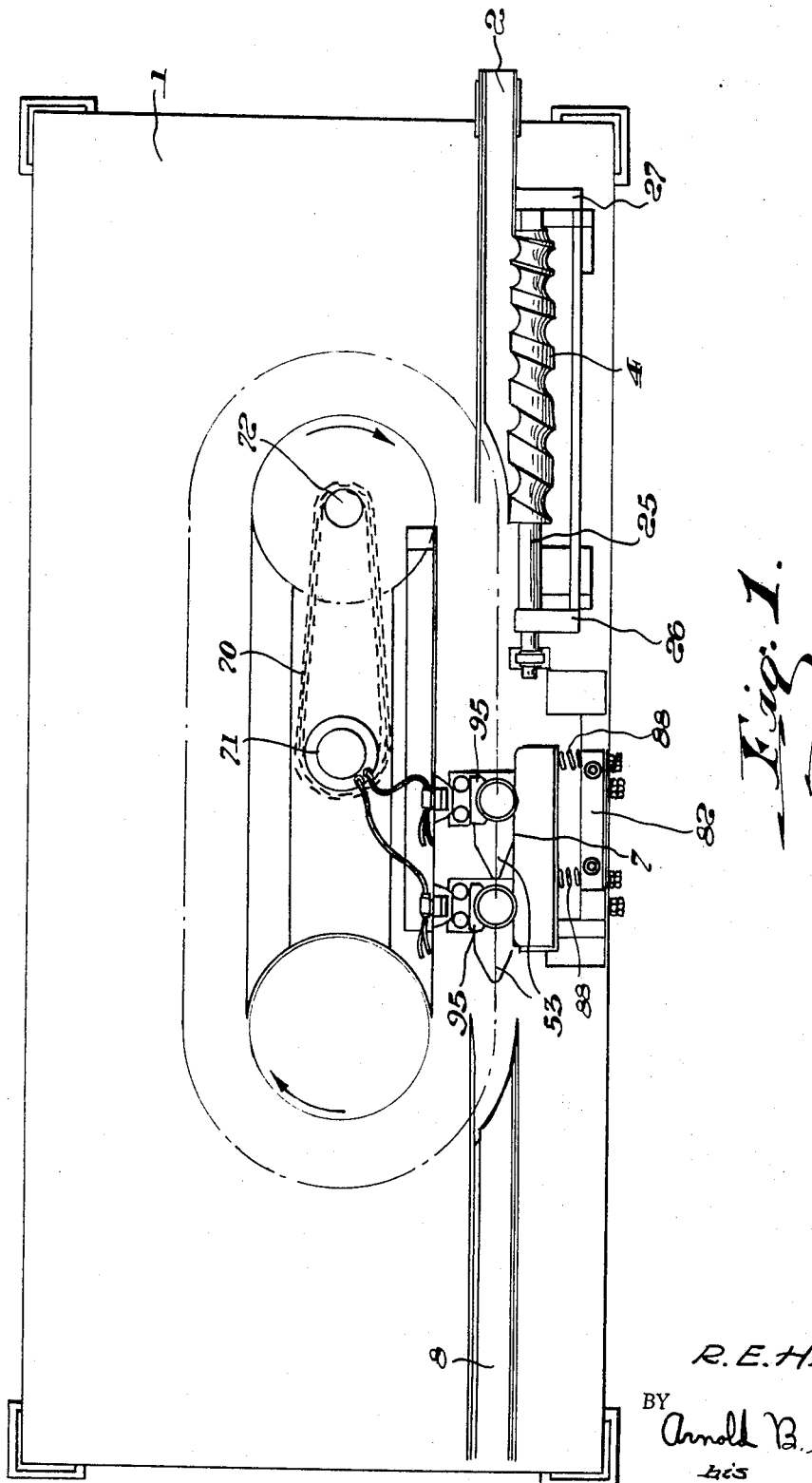
FIGURE 1 is a top plan view of a sealing machine illustrative of this invention.
Figure 2:
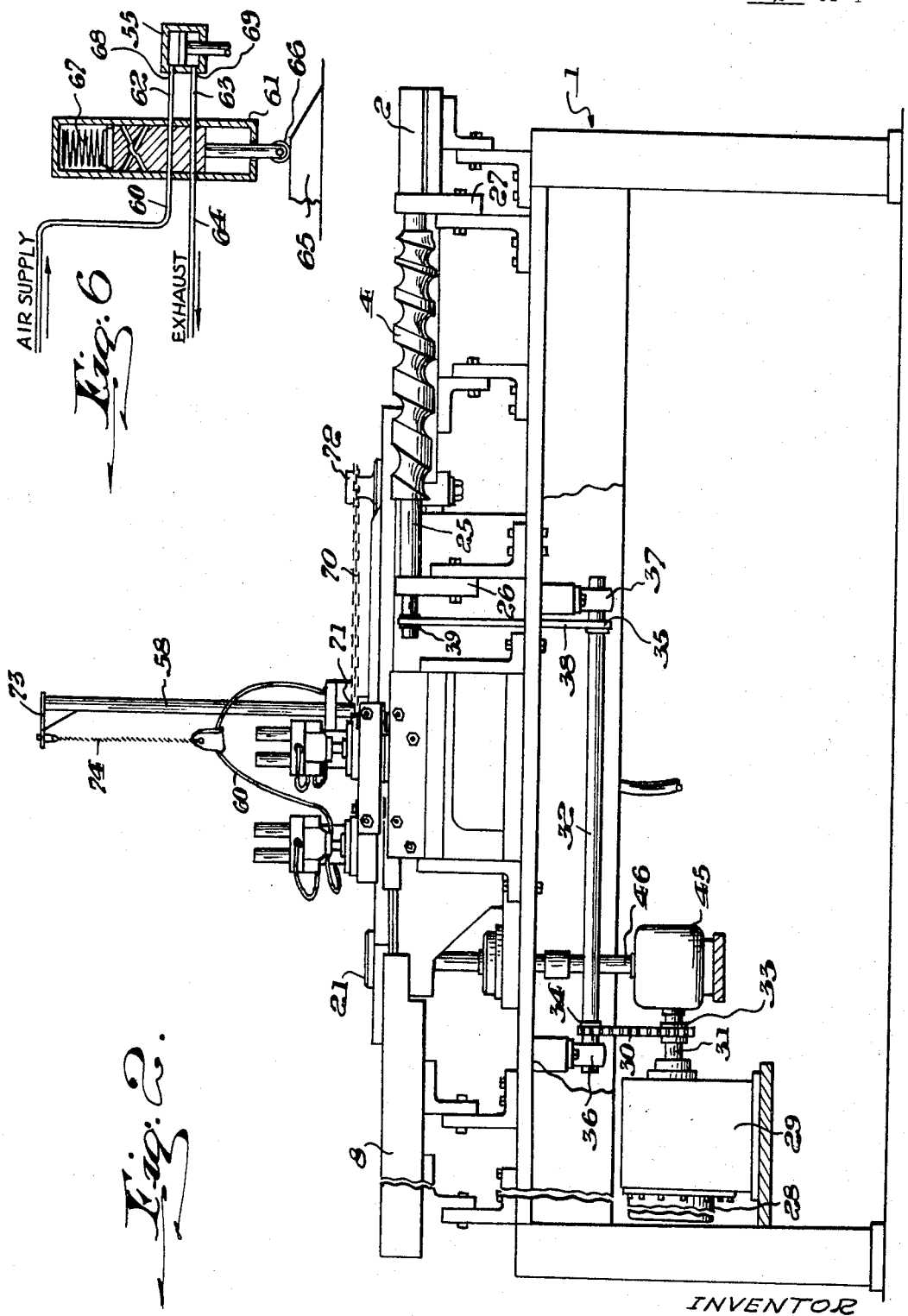
FIGURE 2 is a front elevational view of the sealing machine of FIGURE 1.
Figure 3:
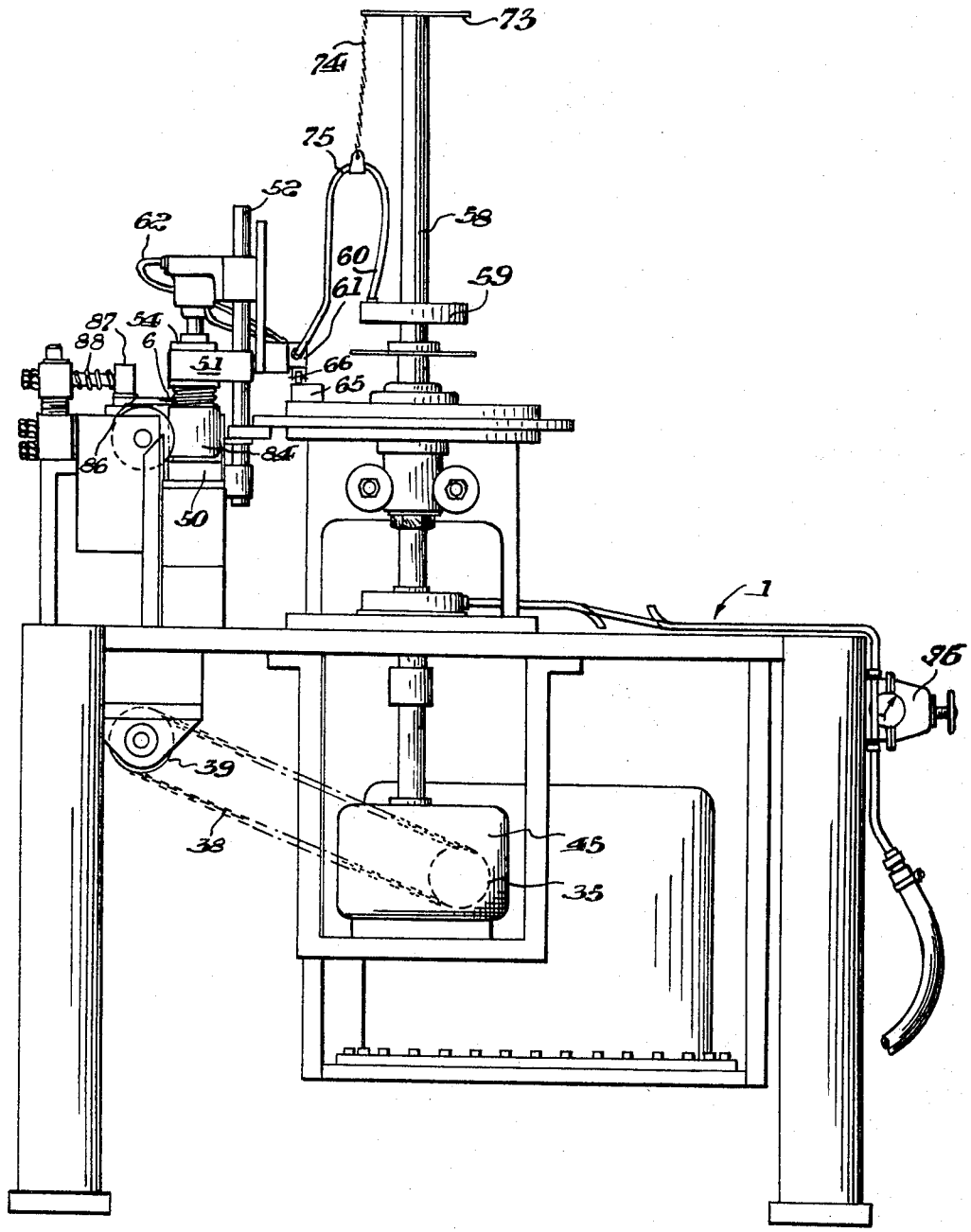
FIGURE 3 is a right side elevational view of the machine.

Turning now to the drawings in greater detail, FIGURES 1, 2 and 3 show the general arrangement of a preferred embodiment of the invention. As also shown schematically in FIGURE 5, at one end of table 1 is an entry platform 2 supporting filled containers 3 having loosely applied closures. The timing of the feed of successive containers is controlled by container screw feed 4 which has a pitch and rotational velocity chosen for the desired rate of feed. The containers are transferred to one of a multiplicity of rotatable container carriers 5 which comprise a base platform 50 and a spaced overlying pressure block 51. The container is received on base platform 50 with the aid of locator 95, then clamped in the carrier by downward vertical movement of pressure block 51, with sufficient pressure being applied to compress the closure gasket to the desired sealing position. While the closure is retained in the clamped position on the container, it is translated in a straight line path into contact with a thread forming blade 6 having a straight edge 7. There is rolling friction contact between the container and the edge of roll rail 80 (shown in FIGURE 4), assuring rotation of the container about its central axis as the container is moved along its path of travel. While the friction roll rail 80, as shown in FIGURE 4, is adapted to contact the container and coordinate rotational velocity with closure sizes, other arrangements may be employed wtih such a rail. The rotating pad 57 may conveniently be secured to a spindle (not shown) extending downwardly through base platform 50, on which is mounted a round disc or wheel. The roll rail would be placed in a position to frictionally engage the disc or wheel and thereby contribute to the axial rotation of the disc or wheel, which rotation is transferred by the shaft to the clamped container assembly. With this latter arrangement, a change in container size would have no bearing on disc or wheel size, which would be changed only when the closure size was altered.

In any event, rotation will occur at the initiation of blade contact with the closure skirt. As a result of continuous contact with the blade edge 7 during translation and rotation of the container and closure, the closure skirt is progressively deformed to provide threads on the closure, thereby sealing the container. The sealed container 9 is then translated to an exit conveyor 8 and released from the container carriers 5 by upward vertical movement of the pressure block 51.

The general path of movement of the container carriers has at least one horizontal straight side and may preferably be substantially rectangular with curved end sectors facilitating smooth change of direction of movement in what may be called the orbital path. The carriers are secured to an endless conveyor member such as a chain, by means of mounting brackets 20. Each horizontal straight side is preferably a substantial portion of the entirety of the orbital path and where the entire path is substantially rectangular, each straight side comprises substantially all of one side of the path. The chain is engaged with sprocket wheels 21, 22, with at least one of the wheels being driven by suitable power means.

Turning now more particularly to the system details, screw feed 4, which is adapted, through control over speed of rotation in relation to pitch, to receive and feed filled containers having loosely fitted closures to the container carriers, at a speed coordinated with the movement of the carriers. The shaft 25 upon which screw feed 4 is mounted, is journalled in bearings 26, 27. The power which drives shaft 25 is provided by motor 28, whose output passes through variable speed drive unit 29. Endless chain 30 transmits the rotation of shaft 31 to shaft 32 by means of its engagement with sprockets 33, 34. Cogged pulley 35 is mounted on shaft 32 which is journalled in bearings 36, 37. Endless cogged belt 38 engages cogged pulley 35 and also cogged pulley 39 on shaft 25, thereby causing rotation of the screw feed responsively to the rotation of shaft 32.

Sprocket wheel 21 is also driven by power supplied by motor 28. Gear box 45 converts the rotational input of shaft 31 to a rotational output on shaft 46 which is connected to sprocket wheel 21. In the specific arrangement illustrated, sprocket wheel 22 functions as an idler wheel. It is, of course, equally effective to have sprocket wheel 22 positively driven and sprocket wheel 21 function as an idler wheel or to have both wheels positively driven. In order to coordinate the speed of orbital movement of the container carriers 5 with the speed of container feed, control and coordination of the rotational speed of shafts 46 and 25 are required. The output of variable speed drive 29 is transmitted to shaft 46 through gear box 45 which provides the desired control over orbital movement of the carriers. The output of speed drive 29 is also transmitted to shaft 25 through chain 30 and sprockets 33, 34 as well as endless belt 38 and pulleys 35, 39, in order to effect rotational speed control of screw feed 4.

Detailed views of the container carriers 5 are shown in FIGURES 5 and 4. The carriers 5 have a base platform 50 and a pressure block 51, each mounted on a column 52. In order to facilitate entry and exit of containers to and from the platform 50, they are provided with forward extensions 53. Pressure block 51 is slidingly mounted on column 52 and is secured to the underside of piston 54 of air cylinder 55, which cylinder is also secured to column 52.

In operation, a filled container having a loosely secured closure shell is conveyed from the horizontal entry platform 2 to the base platform 50 of a container carrier 5 by means of screw feed 4. At the time of container entry onto the base platform 50 the air cylinder piston 54 is in its upper position, as is the attached pressure block 51. As the container is seated on rotatably mounted pad 57 of base platform 50, the air cylinder piston 54 is lowered until closure pad 56 of pressure block 51 firmly engages the closure with sufficient force to place it in the ultimate sealing position, as by compressing the closure gasket. The assembly thus firmly secured within the container carrier 5 is translated in a straight line into the orbital sector where the threading blade 6 is mounted.

Before discussing the threading operation in detail, the operation of the air handling system, which controls the vertical movement of the pressure block 51, will be described. Referring to FIGURES 3 and 4, a source of air (not shown) supplies air to pressure regulating valve 96 which in turn provides air at the desired pressure to rotating column 58 which is hollow. Secured to column 58 and communicating therewith is an air distributor member 59 which has an orifice or port for each container carrier. Secured to each port is an air hose 60 which carries air between the distribution member 59 and the air valve 61 of the particular carrier. A detail of one type of valve arrangement suitable for use with this machine is shown schematically in FIGURE 6. Air lines 62, 63 communicate with both air cylinder 55 and air valve 61. Also entering valve 61 are a supply line 60 and an exhaust line 64. In coordinating the position of piston 54 with respect to the orbital position of the container carriers, a cam 65 and a cam follower or roller 66 are employed to position the valve 61. In the position shown in FIGURE 6, the cam 65 is urging the cam follower or roller 66 upward thereby compressing spring 67 and permitting air to be provided to the upper air cylinder port 68 via lines 60 and 62 and exhaust air is removed from the lower air cylinder port 69 via lines 63 and 64. The piston is, therefore, moved downward to clamp a container between pads 56 and pad 57. In sectors where the cam surface is low, the cam follower or roller 66 is permitted to move downward under the force of spring 67. In that position, air would be supplied to the lower air cylinder port 69 via lines 60 and 63, while air is removed from the upper air cylinder port 68 via lines 62 and 64. In this system, the air pressure available for purposes of clamping is centrally controlled via pressure regulating valve 96, and the air flow direction is controlled by each valve 61 operated by cam 65 and cooperating with the individual air cylinders.

Column 58 rotates at a speed proportional to the rotation of sprockets 21 and 22. This might conveniently be accomplished by means of an endless belt 70 attached to pulley 71 on column 58 and also pulley 72 attached to the shaft on which one of sprockets 21, 22 are mounted. To avoid undue slack and prevent tangling of lines 60, an apertured flange 73 is secured to one end of a spring 74 which has an air line guide 75 mounted at the other end. The guide 75 is such as to restrain air line 60 against the creation of excess slack, while movement of the line 60 is permitted by expansion and contraction of spring 74.

Considering the operation of the illustrated air system with respect to the orbital position of one of the container carriers 5, initially, when the carrier is at the position of container receipt from screw feed 4, the piston 54 is in its upper position. The cam 65 at that point is depressed and the valve 61 emits air through lines 60, 63. At the orbital point where the container is seated on the pad 57 of base platform 50 the cam 65 is at a high position and the valve 6 permits air to flow through lines 60, 62, thereby lowering the piston 54 and clamping the closure and container with the desired sealing force. After sealing has been effected and the container comes out of contact with the blade, the cam 65 which at that orbital point is at a low position permits air flow to cause the piston 54 to be raised thereby releasing the sealed container to the exit conveyor 8.

FIGURE 4 shows a detailed section of the sector of the orbital path containing the threading blade. When a container enters this sector, it is rigidly clamped in the container carrier, to place the closure gasket in the desired compressed position. The container is, however, capable of rotational movement about its own vertical axis. Roll rail 80 is mounted on support 81 which in turn is horizontally resiliently mounted on support 82 as a result of spring 83. When roll rail 80 frictionally engages the orbitally moving container 84, the container is caused to rotate about its own vertical axis. It will be appreciated that while the contact between the clamped closure and container and a blade will provide frictional contact tending to create rotation of the container about its axis, it is generally preferable to provide a roll rail 80 for this purpose.

Threading blade 6 is secured to flat spring 86 which provides it with vertical resiliency. The flat spring 86 is also secured to support 87 which is in turn secured to support 82, with horizontally resiliency being provided by spring 88. Pin 89 acts as a vertical stop to prevent vertical movement of threading blade beyond the desired upper starting point of the threads. At the point of initial engagement between the threading blade 6 and the closure 90, the blade is adjacent the origin of the container thread. The blade deforms the upper portion of the closure skirt to conform to the initial thread portion and as the container carrier moves orbitally across the blade, a complete thread is progressively formed in the closure skirt. While the channel defined by the container thread coupled with the vertical resiliency provided by flat spring 86 may be relied upon to retain the blade in the proper downwardly moving position, it may be desirable to initially bias the blade downwardly along its length with the highest end being the end of initial contact. In instances where the container dimensions vary from standard, spring 88 and flat spring 86 provide sufficient resiliency to avoid glass breakage, while assuring maximum sealing. It will be appreciated that the blade edge is straight as is the sector of the orbital path through which the containers move during sealing. There is, therefore, no centrifugal force upon the container or contents during the critical sealing stage nor at any portion of its travel in the machine. Also, the filled container does not deviate from substantially the same horizontal plane during its travel through the machine. As a result, very high speed sealing is practical without any complications due to increased tangential forces and the resultant difficulties.

A beneficial addition to the machine in instances wherein a so-called "pilferproof band" is to be provided is tucking blade 90, shown in FIGURE 4. In this type of closure a lower portion of the skirt is scored or cut so as to define a band and leave only bridges of closure material connecting it with the remainder of the closure. By reforming this lower band under the closure shoulder, the band will be restrained. When the closure is removed the band is severed from the remainder of the closure through fracturing of the bridges, thus providing a visual indication that the closure has been removed and the integrity of the package has been impaired. Tucking bar 91 has a straight edge 94 and progressively deforms the pilferproof band to conform it to the container shoulder. The bar 91 is secured to support 92. This support 92 is secured to support 82, with horizontal resiliency provided by spring 93. This machine, therefore, is adapted for simultaneous progressive threading and securing of a pilferproof band.

An additional advantage which arises as a result of the substantially rectangular orbital path of the containers and the straight blade edges, is the great facility and economy with which the machine may be altered to correspond to changes in container and closure dimensions. For a substantial range of changes in diameter, all that is required is the moving of the threading and tucking blades 6, 91 inward or outward in a direction perpendicular to the orbital path of the carriers. If desired, manually operable adjusting means such as a hand crank may be provided to facilitate rapid change. Where very large changes in container and closure dimensions are encountered, it may be necessary to also change pads 56, 57 and feed screw 4, but such changes would be minor. Also, in view of the broad range of utility in a given pair of pads and a feed screw, such a change would not be necessary with respect to most commercial uses. With some of the more conventional sealing machines having curved forming blades, a different degree of curvature is required as the size of the closure and container is changed, and, therefore, a different blade must be provided for each diameter change. With respect to changes in container height in my machine, mere vertical movement of pressure block 51 and air cylinder 55 along support means, which in this instance is column 52, provides the necessary change. It will be appreciated that with respect to machines which employ mechanical cams to raise and lower a lower platform so as to move a container into and out of contact with a sealing head, changes of this sort can be effected only by making substantial alterations, in the machine. Such alterations would also entail substantial additional expenditure for substitutional equipment.

If it is desired to increase the output of the machine by a substantial amount, a sealing station may also be mounted on the opposite straight section of the orbital path and the entire system would be duplicated on the other straight side. With minor modifications to the air handling system, the machine's total sealing capacity would be doubled.

There is no technical minimum number of container carriers 5 which may be placed on the machine, but as a practical matter as large a number as can be effectively accommodated should be employed. As is shown in FIGURE 5, it is contemplated that at least two containers may be in contact with the sealing blades simultaneously without interfering with the sealing capabilities of the machine.

With respect to both the thread forming blade 6 and the tucking blade 91, there is no maximum length, but they must be at least as long as the path of forming involved. Thus, the thread forming blade length must be at least as long as the thread to be formed. While, where a tucking blade 91 is employed, it will traverse a shorter forming path than the threading blade, it may prove expedient to make it of length equal to the thread forming blade.

It will be appreciated that the machine is effective without the need for positive drive of the container carriers to create axial container rotation. In fact, such a feature would substantially impair the desired flexibility with respect to modification to accommodate various size containers. If positive rotational means such as a chain and sprocket or rack and pinion were employed, a fixed relationship between container rotational velocity and orbital translation would be established. This would, however, be suitable for only one closure size. For example, if one closure had a circumference of $C_1$ and a second closure had a circumference of $C_2=2C_1$, while each closure would rotate one revolution for each closure circumference travelled, closure $C_2$ would rotate only one-half as frequently as $C_1$ and, therefore, different sprockets or rack and pinions would be required for each size. By eliminating the need for such driving means, the burdensome and expensive task of alteration for various sizes is eliminated.

With respect to the configuration of the container carrier 5 orbital path, it is "substantially rectangular" with curved end walls and the term as used herein shall refer to such a configuration as well as a combination having straight end walls and curved corners. The shorter segments or ends need be spaced no greater than is necessary with respect to the diameter of sprockets 21, 22. The longer sides must be of sufficient length to permit complete straight movement of the container at entry, during clamping and subsequent sealing and release. In effect, there is, therefore, travel of the container over a full side of the rectangle. Where sealing stations are provided on both sides of the machine, which is preferred for maximum capacity, a substantial majority of the entire orbital length will be employed for the movement of containers.

It will thus be appreciated that applicant has provided a machine adapted for high speed sealing of containers by custom tailored threads with the unfilled unsealed container being subjected to only straight line movement throughout. As a result of this, no objectionable centrifugal forces with resultant potential interference with sealing and possible contamination are involved. Also, as a result of the total absence of curvature in the path of travel of the containers, as well as the straightness of blade edges, rapid, simple and economical changeover for different size containers and closures is possible. It will be further appreciated that the container remains on the same horizontal plane with no change in elevation during the passage through the machine. Thus, the container travels through the sealing machine without any change in direction or elevation.

While in the interest of clarity of illustration and explanation specific embodiments of the invention have been described, it will be apparent to those skilled in the art that numerous variations of the details may be made without departing from the appended claims. Where, for example, drive and power transmission means are shown, other obvious means may be substituted to provide the ultimate movements required by the invention.

Also, while the container carriers 5 have, for purposes of example, been disclosed as having an orbital path which lies within a substantially horizontal plane, it will be appreciated that the endless conveyor chain carrying the carriers 5 may revolve about a vertical axis with column 58 being disposed horizontally. This is merely a matter of individual needs and preferences. It is, however, essential that the orbital path of the carriers while the containers are on them be horizontal and straight.

What is claimed is:

1. A machine for sealing of closures to containers comprising, in combination,
    an endless conveyor member;
    a multiplicity of container carrier means, and support means therefor, associated with said endless conveyor member, each said carrier means having a container receiving platform and a spaced overlying pressure block adapted to rotatably support therebetween a container having an unsealed closure applied thereto;
    each said carrier means being secured through said support means to said endless conveyor member for transporting said carrier means in a path having at least one horizontal straight side;
    a horizontal entry platform in line and communicating with said straight side of said path for supplying to said carrier means a container having an unsealed closure applied thereto;
    container feed means at said entry platform to coordinate the timing of entry of a container with the movement of said carrier means;
    power means for driving said endless conveyor member and said container feed means;
    carrier control means associated with each said carrier means for downwardly displacing its pressure block to sealingly clamp said closure and container between said receiving platform and said pressure block;
    a straight edged threading blade mounted along said straight side of the path of travel of said carrier means;
    said threading blade being adapted to engage the skirt of a closure and progressively deform said skirt to conform the same to the threaded surface of said container as said container and closure rotate and travel along said straight side of the path aforesaid;
    said carrier control means being adapted to vertically upwardly displace said pressure block to release a container from clamped engagement in said container carrier after said threading has been completed; and
    means for receiving containers released from said carriers.

2. The sealing machine of claim 1 wherein said path is substantially rectangular, said thread forming blade is horizontally and vertically resiliently mounted, and a straight edged elongate member is provided along said straight side of said path adapted to frictionally induce container rotation as said container travels therealong.

3. The sealing machine of claim 2 wherein said container feed means is a screw feed member adapted for straight line movement of a container.

4. The sealing machine of claim 3 wherein said carrier control means comprises a cam and cam follower adapted to operate valve means to regulate air flow to an air cylinder having a piston overlying and secured to said pressure block, and pressure regulating means supplying said carrier control means with air at the pressure required to effect the desired clamping pressure exerted by said pressure block.

5. The sealing machine of claim 3 having a resiliently mounted straight edge tucking blade adapted to progressively reform a lower skirt portion of said closure, having a circumferentially weakened connection with the remainder of the closure, into engagement with said container.

6. The sealing machine of claim 3 wherein said straight side is a substantial portion of the entirety of said path and said elongate member is a roll rail adapted to frictionally engage said container.

7. The sealing machine of claim 3 wherein said endless conveyor member to which said support means of said carrier means are secured is an endless chain and said chain cooperates with two sprocket wheels, at least one of which is positively driven by said power means.

8. The sealing machine of claim 3 having speed control means intermediate said power means and said screw feed member, and intermediate said power means and at least one of said sprocket wheels.

9. The sealing machine of claim 2 wherein said container receiving platform remains in substantially the same horizontal plane throughout its path.

10. The sealing machine of claim 3 having an entry platform, screw feed means, threading blade, and elongate member adapted to frictionally establish axial container rotation, on more than one straight side of said path.

11. The sealing machine of claim 9 wherein the path traversed by each container comprises substantially all of one side of said substantially rectangular path.

References Cited

UNITED STATES PATENTS

| 2,153,039 | 4/1939 | Darling | 53—329 |
| 2,902,809 | 9/1959 | Wysocki | 53—329 |
| 3,134,211 | 5/1964 | Roberts et al. | 53—317 X |

TRAVIS S. McGEHEE, *Primary Examiner.*

R. L. FARRIS, *Assistant Examiner.*

U.S. Cl. X.R.

113—1, 30